UNITED STATES PATENT OFFICE.

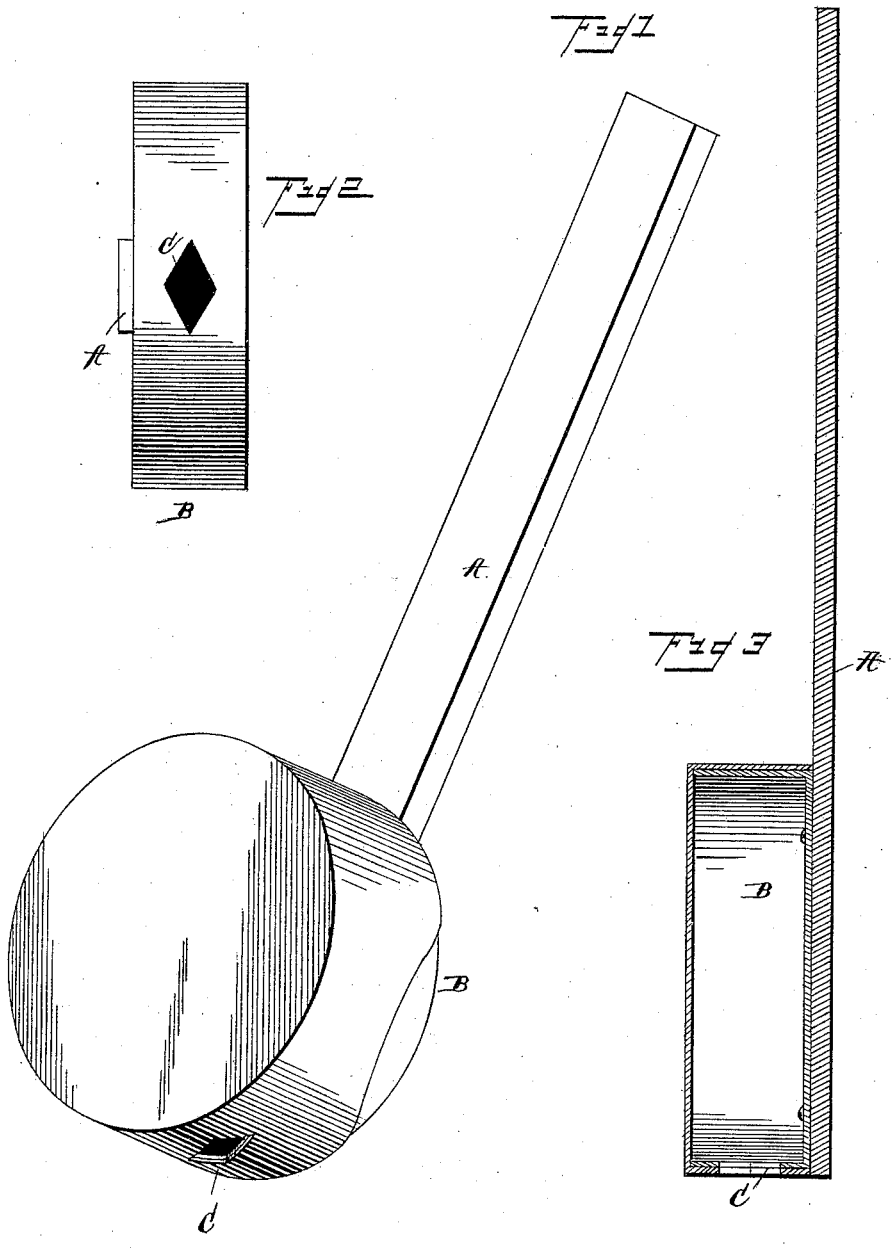

TRUMAN ROBERTS PARRY, OF MANATEE, FLORIDA.

HAND-SEEDER.

SPECIFICATION forming part of Letters Patent No. 401,584, dated April 16, 1889.

Application filed January 4, 1889. Serial No. 295,402. (No model.)

*To all whom it may concern:*

Be it known that I, TRUMAN ROBERTS PARRY, a citizen of the United States, residing at Manatee, in the county of Manatee and State of Florida, have invented a new and useful Improvement in Hand-Seeders, of which the following is a specification.

My invention relates to an improvement in hand-planters; and it consists in certain novel features hereinafter described and claimed.

In the accompanying drawings, Figure 1 is a perspective view of the planter constructed in accordance with my invention. Fig. 2 is a bottom view of the same. Fig. 3 is a vertical section.

Referring to the drawings by letter, A designates the handle, which may be of any desired material and of proper length to extend nearly to the ground when its upper end is grasped by the hands of the operator. To the lower end of the handle I secure the hopper B, which consists of two semi-cylindrical boxes fitting one within the other and provided in their sides with the discharge-openings C. The said openings are arranged at the lowest point of the boxes and are adapted to allow the seeds to escape from the hopper and fall to the ground. The outer box fits snugly on the inner box and can be adjusted upon the same so as to cause the two openings C C to register, so as to allow the seed to escape rapidly or to throw the said openings out of alignment, so as to prevent the escape of the seed. The flow of the seed can thus be regulated at will by causing the outer box to cover more or less of the discharge-opening in the inner box, as will be readily understood.

In practice the ground is prepared for the seed and the rows marked out in any desired manner. The seed is placed in the hopper and the operator then grasps the upper end of the handle and walks along the rows, holding the planter by his side and gently vibrating the same, so as to agitate the seed and cause them to escape through the discharge-opening and fall onto the ground. When all of the seed has escaped from the hopper, the outer box is removed, a new supply of seed placed in the hopper, the outer box then replaced, and the operation of planting resumed.

From the foregoing description it will be seen that I have provided a very cheap and simple planter, by which a large field can be rapidly and easily sown by hand.

Having thus described my invention, what I claim, and desire to secure by Letters Patent, is—

The improved hand-planter herein described and shown, comprising a handle and a hopper secured to the lower end of the handle, and consisting of two semi-cylindrical boxes provided with discharge-openings in their sides and one moving upon the other, as specified.

In testimony that I claim the foregoing as my own I have hereto affixed my signature in presence of two witnesses.

TRUMAN ROBERTS PARRY.

Witnesses:
  W. A. STEBBINS,
  E. C. AYRES.